(12) United States Patent
Atencio

(10) Patent No.: US 11,480,253 B2
(45) Date of Patent: Oct. 25, 2022

(54) HYDRALOCK FRAC VALVE

(71) Applicant: Oil Patch Group, Inc., Houston, TX (US)

(72) Inventor: Donald Atencio, Spring, TX (US)

(73) Assignee: Oil Patch Group, Inc., Houston, TX (US)

( * ) Notice: Subject to any disclaimer, the term of this patent is extended or adjusted under 35 U.S.C. 154(b) by 0 days.

(21) Appl. No.: 16/528,412

(22) Filed: Jul. 31, 2019

(65) Prior Publication Data

US 2021/0033199 A1 Feb. 4, 2021

(51) Int. Cl.
*F16K 3/20* (2006.01)
*E21B 34/02* (2006.01)
*E21B 43/26* (2006.01)

(52) U.S. Cl.
CPC .............. *F16K 3/207* (2013.01); *E21B 34/02* (2013.01); *E21B 43/26* (2013.01)

(58) Field of Classification Search
CPC ... F16K 3/10; F16K 3/20; F16K 3/207; E21B 34/02
See application file for complete search history.

(56) References Cited

U.S. PATENT DOCUMENTS

| | | |
|---|---|---|
| 1,476,344 A | 12/1923 | McGee et al. |
| 3,044,741 A | 7/1962 | Grove |
| 3,095,004 A | 6/1963 | Jackson, Jr. et al. |
| 3,181,552 A | 5/1965 | Jackson, Jr. |
| 3,367,625 A | 2/1968 | Fortune |
| 3,765,440 A * | 10/1973 | Grove ..................... F16K 5/205 137/246.22 |
| 3,890,991 A * | 6/1975 | Grove ....................... F15B 1/02 137/1 |
| 3,990,679 A | 11/1976 | Boitnott |
| 4,136,710 A | 1/1979 | Bond |
| 4,319,734 A * | 3/1982 | Acar ....................... F16K 5/201 251/174 |
| 4,658,847 A * | 4/1987 | McCrone ................ E06B 5/164 137/72 |
| 5,624,101 A * | 4/1997 | Beson ..................... F16K 5/201 251/172 |
| 9,850,740 B2 | 12/2017 | Atencio |
| 9,890,601 B2 | 2/2018 | Baudoin |

(Continued)

FOREIGN PATENT DOCUMENTS

WO WO-9825057 A2 * 6/1998 ............. F16K 3/207

*Primary Examiner* — Hailey K. Do
(74) *Attorney, Agent, or Firm* — Norton Rose Fulbright US LLP

(57) ABSTRACT

Improved apparatuses, systems, and methods for sealing a frac valve using pressurized fluid to drive one or more seal assemblies into sealing contact with a valve gate without substantial relative movement of the seal assembly components. In some embodiments, the improved apparatuses, systems, and methods provide a sealant to the face of the valve gate to ensure a fluid tight seal, a plurality of biased springs to ensure the seal assemblies are positioned properly to create a fluid tight seal, a shield to prevent fluids, particulates, and/or other materials from interfering with the operation of or damaging the seal assemblies, and/or a recess for receiving fluids, particulates, and/or other materials that would otherwise interfere with a fluid-tight seal or cause damage to the seal assemblies or valve gate.

22 Claims, 7 Drawing Sheets

(56) References Cited

U.S. PATENT DOCUMENTS

| | | |
|---|---|---|
| 9,951,582 B2 | 4/2018 | Baudoin |
| 2002/0185625 A1* | 12/2002 | Gosling ................ F16K 5/0678 |
| | | 251/315.01 |
| 2008/0041462 A1 | 2/2008 | Janway et al. |
| 2010/0090146 A1* | 4/2010 | Keeper ................... F16K 5/188 |
| | | 251/172 |
| 2014/0217320 A1 | 8/2014 | DeOcampo et al. |
| 2014/0318807 A1 | 10/2014 | Atencio |
| 2017/0102078 A1 | 4/2017 | DeOcampo et al. |
| 2017/0285668 A1 | 10/2017 | Moseley et al. |
| 2018/0112492 A1 | 4/2018 | Atencio |
| 2018/0230763 A1 | 8/2018 | Baudoin |

* cited by examiner

HYDRALOCK FRAC VALVE

FIELD OF THE DISCLOSURE

The present invention relates generally to oil and gas fracturing equipment, and more particularly to improved apparatuses, systems, and methods to block or prevent fluids, particulates, and other materials from entering the internal bore of fracturing (fracking or frac) equipment and valves.

BACKGROUND

In the oil and gas industry there is a practice called fracking, to speed up the migration of gas and petroleum fluid from source rocks or reservoir rocks. This is a process where high pressure pumps and powerful engines pumps sand, water and/or chemicals through high pressure flow lines, valves, and equipment that are attached to fracking devices known in the industry as a frac valve, frac stack or frac equipment, hereinafter referred to collectively as a frac valve. A frac valve can be configured in many different sizes and pressure ratings. Each design is usually specific to the user's application and requirements. Frac valves are attached to a wellhead that is attached to a high-pressure pipe that can extend thousands of feet into the ground and be cemented into gas or oil formation. These devices are attached to the wellhead by bolting or other well-known means of fastening and are tightened to a predetermined torque by hydraulics or hammer tools.

The fracking process requires high pressure pumps to push the fracturing fluids, including proppants (a material such as grains of sand, ceramic, or other particulates that prevent the fractures from closing when the injection is stopped) into the injected fluid and chemicals through the frac valves for several hours or days; depending on the amount of proppants and fluids required to be injected into the ground at high pressures, and velocity to break up and create cracks in the formation.

A typical frac valve 100 is shown in FIG. 1. During the fracking process, abrasive proppants, fluids, and chemicals 120 are able to flow (e.g., in direction 130) through the bores of frac valve 100 at high pressures and high velocities and into the casing wellbore and finally into the formation. During this process, materials 120 are permitted to flow into cavities 140 of frac valve 100, an area left void by movement of valve gate 110. This allows the materials 120 to travel into the cavity 140 and fill it with debris 150, such as proppants and chemicals. Once such debris work their way into cavities and bores, such as cavity 140 (or spaces between parts, which are required for any moving part to function properly), many problems occur that cause the equipment to wear, malfunction, fail or become inoperable. This can cause a dangerous situation to life and/or the environment, especially given the high pressure such equipment can be under.

A typical frac valve 100 as shown in FIG. 1 is used to contain and shut off pressure to perform special or specific functions during a frac operation by opening and closing valve gate 110 (e.g., by raising valve gate 110 to allow the flow or lowering to stop the flow) by means such as a hand operated wheel or use of air or hydraulic actuators, or otherwise. The high pressure is sealed off by closing valve gate 110 during or after the fracturing operation.

Frac valve 100 and other associated high-pressure valves must be operated under or with high pressure. Additionally, sometimes frac valves 100 require high torque to force the gate opened and closed at high pressures that are pressing against the open or closed gate 110 of the frac valve 100. While frac valves, like frac valves 100, and associated fittings have tightly controlled inside and outside parameters, there must be looser tolerances in order for a valve gate, like valve gate 110, to travel in and out of the its cavity (e.g., cavity 140). Accordingly, due to these loose tolerances, valve gate 110 cannot properly seal against or seat on one or both sides of cavity 140. Additionally, an added seal for such valve gate may fit tightly to help prevent an insufficient seal but may seal too tightly and prevent or interfere with movement of valve gate 110 into an open or closed position.

Patent Application Ser. No. 15/848,400, which the named inventor of the present application developed, provides a solution to these problems by providing an apparatus and method to mechanically energize at least one seat to move and press against the gate with enough force and pressure to prevent and block the passage of fluids and debris from entering into the body of the valve cavity.

SUMMARY

The presently presented apparatuses, systems, and methods provide an improved solution to the aforementioned problems that is simpler, more robust, and more effective than the solution provided in patent application Ser. No. 15/848,400. In the presently presented apparatuses, systems, and methods, an integral or multiple component seal assembly is provided that operates without any substantial relative movement between the components of the seal assembly, providing a simpler and more efficient means to create a pressurized fluid seal against the valve gate. Additionally, the improved configuration permits the inclusion of additional features to ensure an effective seal.

For example, in some embodiments, the seal assemblies of the presently presented apparatuses, systems, and methods include one or more springs biased to position the seal assemblies in close proximity and/or contact with the valve gate. In such embodiments, the springs do not provide enough force to prevent movement of the valve gate between open and closed positions, but do help ensure that the seal assemblies are always in close enough proximity to create an effective seal when pressurized by a fluid force.

In some embodiments, a shield is provided at a distal end of the seal assemblies that prevents fluids, particulates, and other matter from the valve lumen entering the portions of the valve bore between the seal assemblies and the valve body that may otherwise interfere with or damage the seal assemblies or valve body. For example, the shield may be used to prevent materials from the valve lumen interfering with and/or eroding the biased springs.

In some embodiments, the seal assemblies of the presently presented apparatuses, systems, and methods include more than one fluid injection port for each seal assembly; for example, where a first fluid injection port provides pressurized fluids into contact with the seal assembly (but not the face of the valve gate) to drive the seal assembly into sealing contact with the valve gate, and a second fluid injection port provides non-pressurized fluids through one or more lumens in the seal assembly to provide a sealant, such as a hydrocarbon-based sealant, to the face of the valve gate and thereby provide an additional sealing means. Such a configuration may be advantageous, for example, where the pressurized fluid is ineffective in providing a sufficient seal or sufficiently pressurized fluid cannot be provided.

In some embodiments, a recess is provided around a portion of a seal assembly that may receive fluids, particulates, and other matter from the valve lumen that may otherwise be trapped between the seal assembly and the valve gate and, but for being received by such recess, may interfere with the seal or cause damage to the seal assembly and/or valve gate.

In some embodiments, the one or more seal assemblies are made of multiple components such as a piston component and a valve seat that each have a maximum axial length that is less than or equal to the maximum axial length of the valve gate so that the seal assemblies may be positioned in an already existing frac valve apparatus, i.e., by positioning them in such frac valve apparatus through the opening for the valve gate.

Other objects, advantages, and novel features, and further scope of applicability of the presently presented apparatuses, systems, and methods will be set forth in part in the detailed description to follow, taken in conjunction with the accompanying drawings, and in part will become apparent to those skilled in the art upon examination of the following, or may be learned by practice of the presently presented apparatuses, systems, and methods.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. In any disclosed embodiment, the terms "substantially" may be substituted with "within [a percentage] of" what is specified, where the percentage includes 0.1, 1, and 5 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
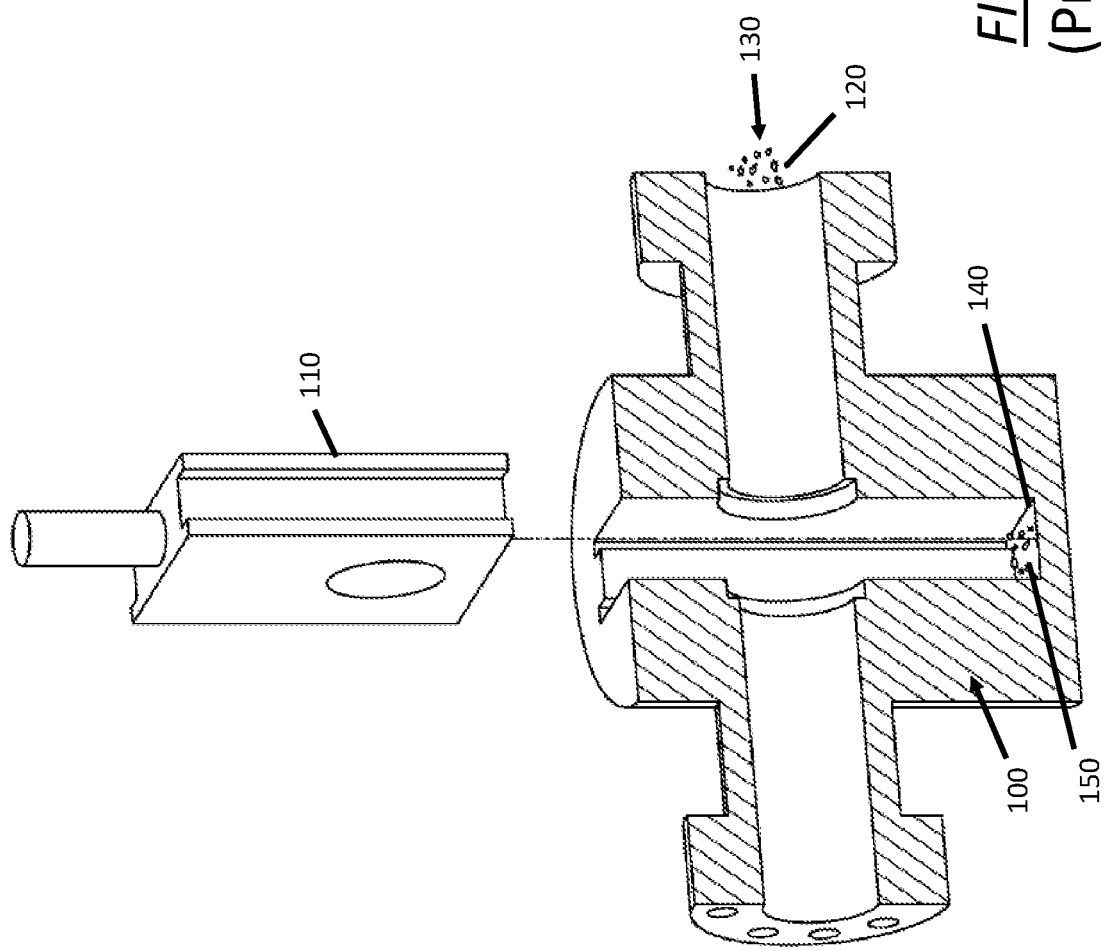
FIG. 1 depicts a frac valve as known in the prior art.
Figure 2:
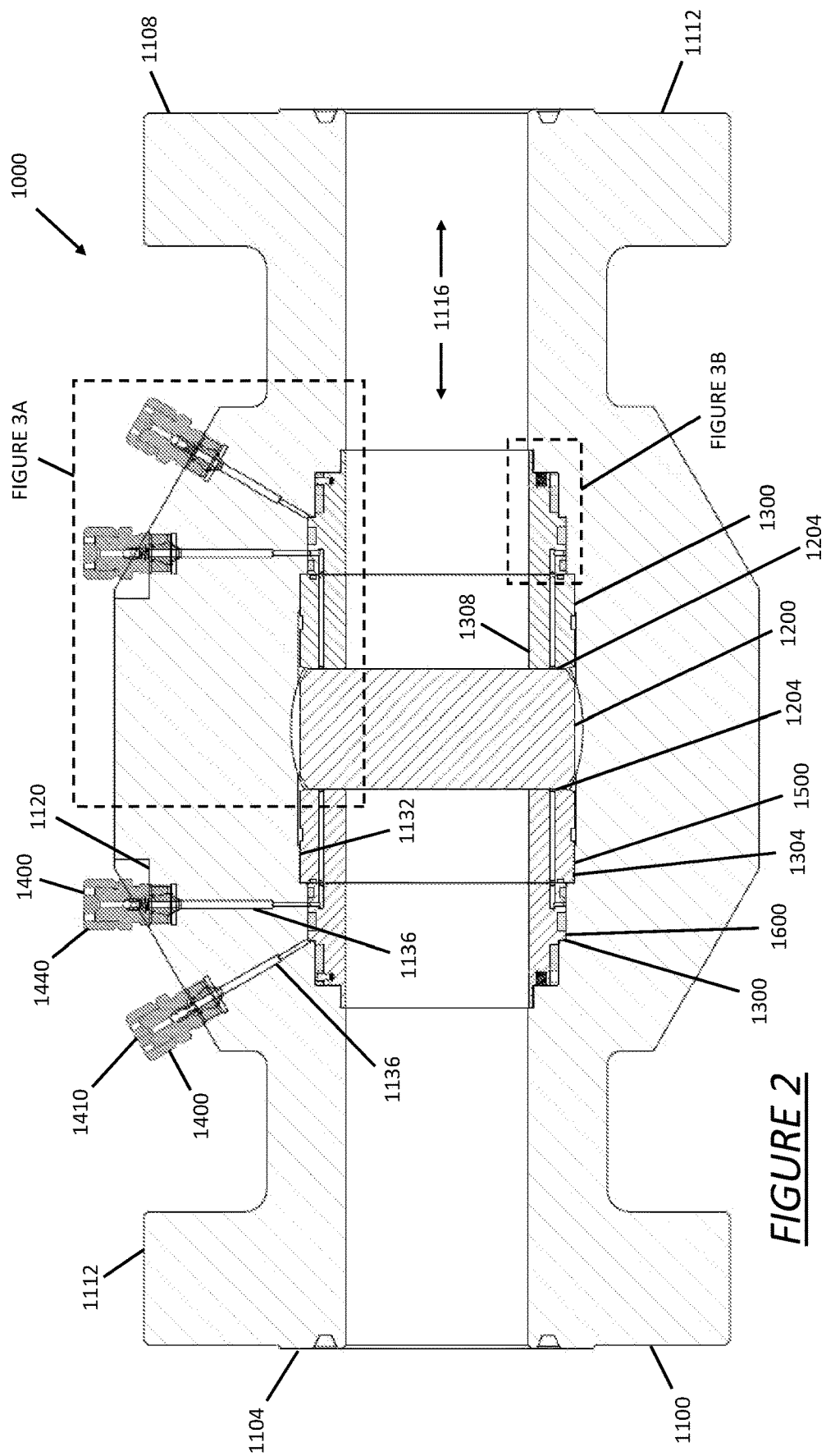
FIG. 2 depicts a cross-sectional top view of a frac valve apparatus according to some embodiments of the present systems, apparatuses, and methods.

Referring to the drawings, FIG. 2 depicts a top cross-sectional view of a frac valve apparatus 1000 having a valve body 1100, a valve gate 1200, seal assemblies 1300, and fluid injection ports 1400. Valve body 1100 can be configured similar to the valve body of frac valve 100 shown in FIG. 1, but having the additional features described herein, such as a bore 1132 for receiving one or more seal assemblies 1300, one or more injection port recesses 1120 on an exterior surface to facilitate connection of one or more injection ports, such as non-pressurized fluid injection ports 1440, and/or one or more injection port cavities 1136 extending between an exterior surface of valve body 1100 and bore 1132 for each receiving at least a portion of a fluid injection port 1400 (e.g., tubes 1414, 1444) therein. Valve bore 1132, recesses 1120, and cavities 1136 can be formed in valve body 1100 by molding, machining, or other manufacturing methods, and existing valve bodies can be modified (e.g., by machining) to include such features.

Valve body 1100 has a first end 1104 and a second end 1108. Each end 1104, 1108 may have a flange, such as flange 1112, to facilitate connection of the end to other equipment such as tubing or pumps (though other means of connection could alternatively or additionally be used, such as threading). Valve body 1100 includes a lumen 1116 substantially centrally located along an axis between ends 1104 and 1108. Fluids, such as stimulation fluids (e.g., chemicals) and production fluids (e.g., oil and gas), particulates (e.g., proppant), and other matter may travel through valve lumen 1116 between ends 1104 and 1108 when valve gate 1200 is at least partially open.

Valve gate 1200 may be configured similar to valve gate 110 shown in FIG. 1 such that it can be moved into and out of the central portion of bore 1132 to permit (when out) and prevent (when in) fluid communication between ends 1104 and 1108 along valve lumen 1116. Valve gate 1200 may have one or more valve gate faces 1204 (e.g., two) that are each in fluid communication with valve lumen 1116 when valve gate 1204 is in a closed position. Each valve gate face 1204 may be configured to be in contact with an adjacent face of a seal assembly 1300 when such seal assembly 1300 is activated by injection of pressurized fluid through a corresponding pressurized fluid injection port 1410, as explained further below with reference to FIGS. 3A and 3B.

One or more seal assemblies 1300 may be positioned within bore 1132 of valve body 1100. When so positioned, seal assemblies 1300 (together with valve gate 1200, when in a closed position) may substantially fill bore 1132. A seal assembly 1300 may be positioned on either side of valve gate 1200 to prevent (when such seal assemblies are activated) fluids, particulates, and/or other materials from valve lumen 1116 entering valve bore. Each seal assembly 1300 may be of a substantially cylindrical shape having a stepped, outer cylindrical surface 1304 that varies in diameter at different intervals along its length and corresponds to the shape of valve bore 1132. Each seal assembly 1300 may also have an inner cylindrical surface 1308 having a substantially constant diameter that is substantially the same as the diameter of valve lumen 1116. Inner surface 1308 of valve assemblies 1300 is in fluid communication with valve lumen 1116 when such seal assemblies are positioned in valve bore 1132 as shown in FIG. 2. Each seal assembly 1300 may be made of multiple components, such as valve seat 1500 and piston component 1600, as shown, or may be a single, integral component.

Figure 3A:
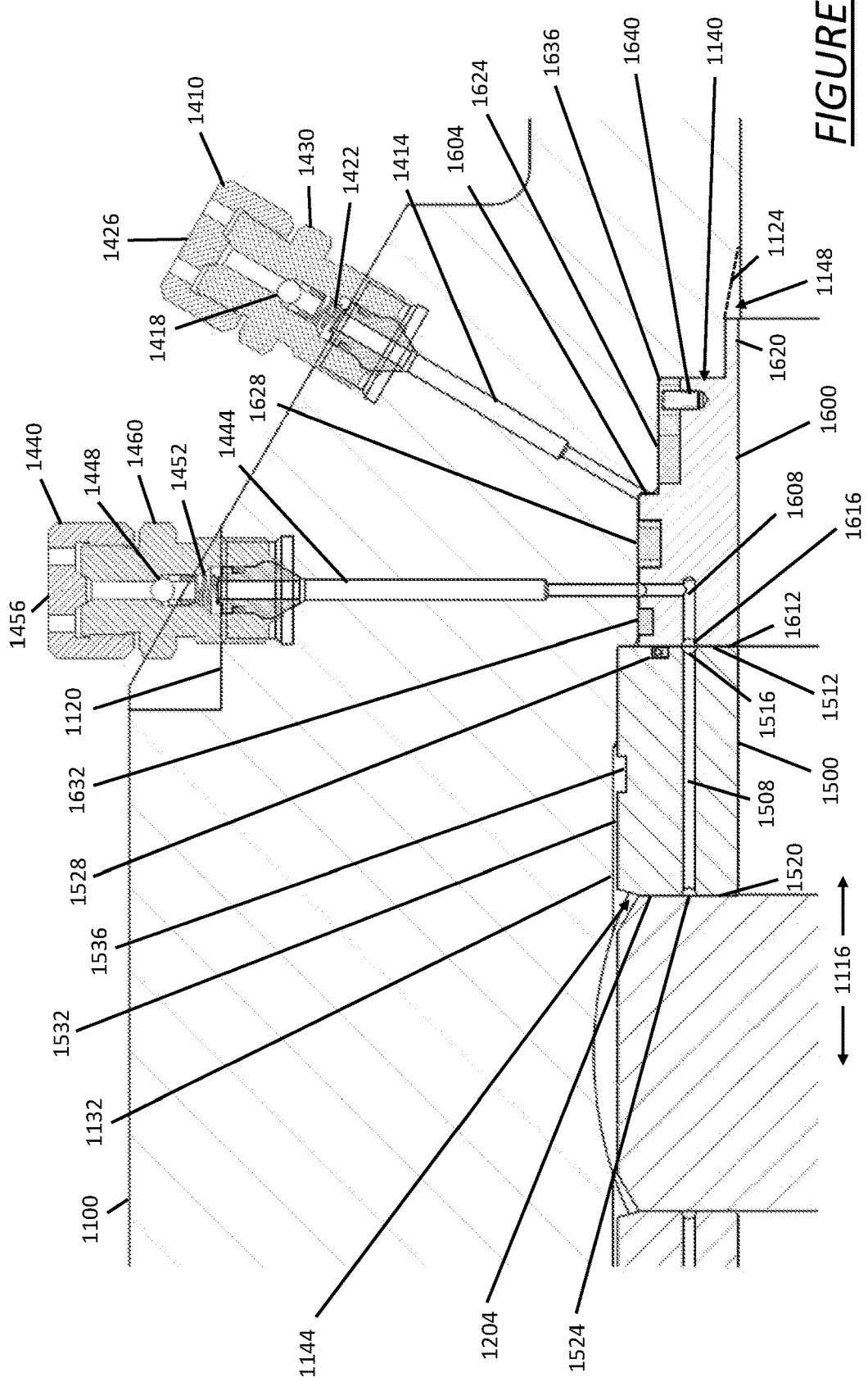
FIGS. 3A and 3B depict enlarged views of different portions of FIG. 2 as indicated in FIG. 2 herein.
Figure 3B:
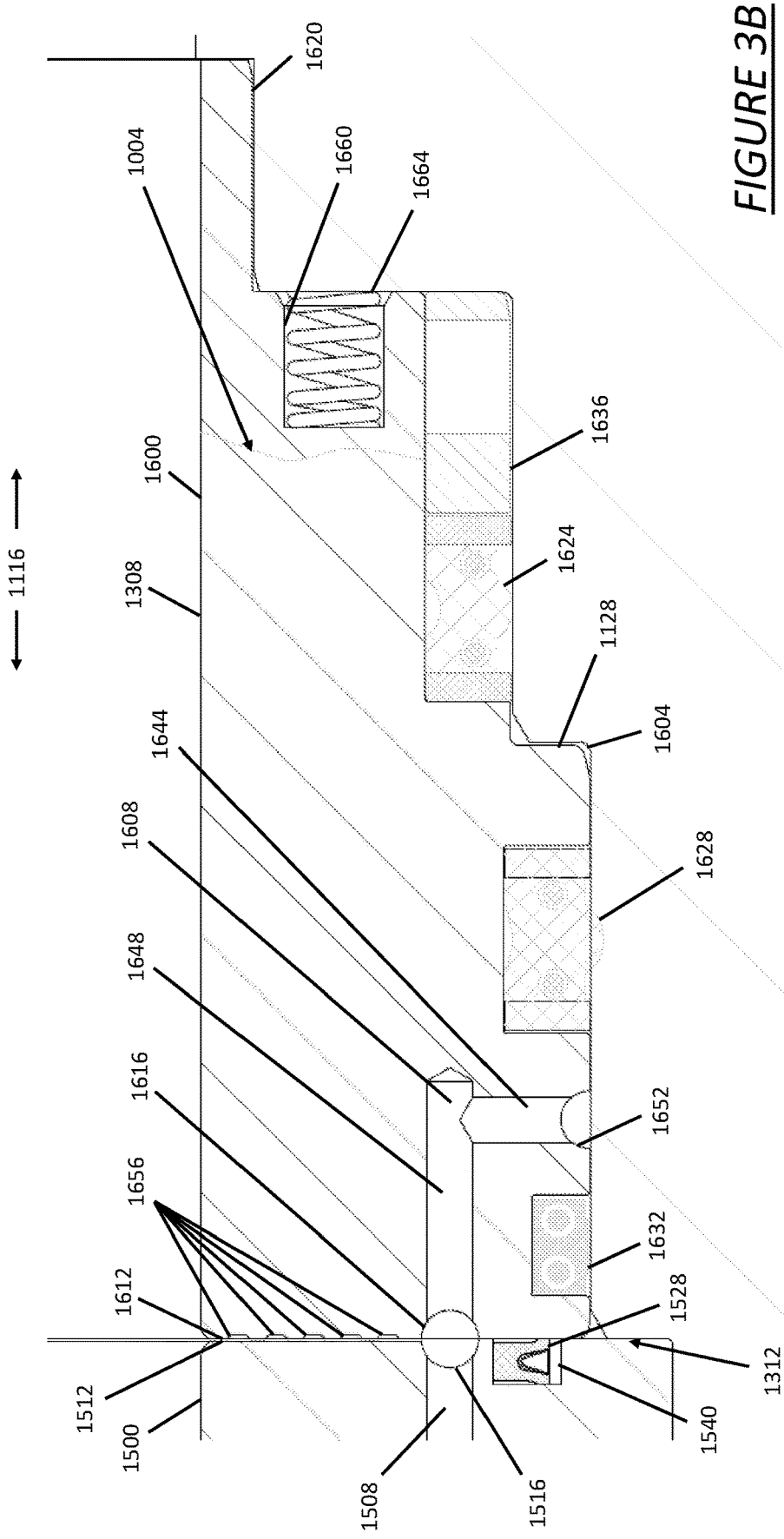

Turning to FIGS. 3A and 3B, which are enlarged views of portions of FIG. 2 (as indicated in FIG. 2), further details of a seal assembly 1300 and its operation will be discussed. Beginning on the right side of FIG. 3A, a piston component 1600 is positioned substantially within a portion of bore 1132 such that a pocket 1604 is formed in bore 1132 (at shoulder 1128—see FIG. 3B) between piston component 1600 and the interior surface of valve body 1100. A tube 1414 of a pressurized fluid injection port 1410 is in fluid communication with pocket 1604. Tube 1414 (and other portions of pressurized fluid injection port 1410) may be disposed within a cavity 1136, as discussed above, such that there is a fluid tight seal between tube 1414 and cavity 1136; if desired, this may be accomplished by permanently affixing the tube 1414 within cavity 1136, such as with a permanent adhesive or otherwise. A pressurized fluid (e.g., hydraulic or pneumatic fluid) may be injected through pressurized fluid injection port 1410 through tube 1414 and into pocket 1604 against piston component 1600 to drive piston component 1600 toward valve gate 1200. Alternatively, no tube 1414 may be employed and a pressurized fluid may be injected directly through cavity 1136 and into pocket 1604. Pressurized fluid injection port 1410 may include a valve assembly 1418 that is biased to prevent fluid injection through tube 1414 (or directly into cavity 1136) by a spring 1422, and that allows injection of pressurized fluid into tube 1414 (or directly into cavity 1136) when distal component 1426 is compressed toward flange 1430. Piston component 1600 can be made of a material, such as steel, that is sufficiently strong to withstand such fluid pressure injection (including repeatedly) without significant wear or failure. Cylindrical seals 1624 and 1628 (e.g., 0-rings or the like) are disposed on either side of pocket 1604 around the entire outer circumferential surface of piston component 1600 to substantially prevent any of the pressurized fluid from flowing out of pocket 1604. An additional cylindrical seal 1636 (e.g., an energizer ring) is disposed adjacent to seal 1628 and includes a plurality (e.g., four) of openings that correspond to openings 1668 of piston component 1600 (as shown more clearly in FIG. 5) spaced at intervals on its outer circumferential surface, each for receiving a pin 1640. Pins 1640 couple together seal/energizer ring 1636 and the body of piston component 1600.

In the embodiment shown, piston component 1600 is in contact at face 1612 with face 1512 of a valve seat 1500 so that valve seat 1500 is driven (e.g., by movement of piston component 1600) into sealing contact at its face 1520 with valve gate face 1502 of valve gate 1200 when piston component 1600 is driven by pressurized fluid in pocket 1604 toward valve gate 1200. Such action is performed without substantial (or any) relative movement between piston component 1600 and valve seat 1500. (In other embodiments (not shown), piston component 1600 and valve seat 1500 may be integral. Any of the features described below with reference to valve seat 1500 may also be included in such integral embodiments.) Additionally, as shown more clearly in FIG. 3B, piston component 1600 (or seal assembly 1300 generally) may include one or more springs 1664, each positioned within a spring recess 1660 of piston component 1600, which may bias/drive seal assembly 1300 toward (and in some cases against) valve gate face 1204. The bias/force from springs 1664 may be sufficient to keep seal assembly 1300 in very close proximity (and even contact with) valve gate face 1204 but not so great that it will prevent valve gate 1200 from being moved to an open or closed position with relative ease. As indicated by the different cross-hatching across line 1004 in FIG. 2 (and shown more clearly in FIG. 5), spring recesses 1660 are intervally-spaced but are not positioned in the same axial plane as intervally-spaced openings 1668 that receive pins 1640. This is shown more clearly in FIG. 5, which is a cross-sectional view along the line A-A of FIG. 4B (which is a side cross-sectional view of piston component 1600, shown before assembly in frac valve apparatus 1000). As shown in FIG. 5, piston component 1600 has a series of twelve spring recesses 1660 spaced circumferentially at equidistant intervals for receiving twelve springs (one in each) therein (though any reasonable number of recesses and springs may be employed). Four openings 1668 are similarly spaced circumferentially at equidistant intervals for receiving (through the outer circumferential surface of piston component 1600 at that location) four pins 1640 (one each) therein (though any reasonable number of recesses and pins may be employed), though at different circumferential locations so that the recesses 1660 and 1668 do not intersect. (In some embodiments (not shown), spring recesses (and therefore also the corresponding springs) may be positioned at different locations in seal assemblies so long as such springs can bias the seal assembly sufficiently toward the valve gate in the manner discussed. For example, in an integral seal assembly embodiment (i.e., without separate piston and valve seat components), one ore more spring recesses (and corresponding springs) may be positioned at circumferential intervals substantially at locations 1312 indicated in FIG. 3B. In such an exemplary configuration, the spring recesses (and corresponding springs) and pin recesses (and corresponding pins) need not be positioned in different axial planes.)

At a distal end (i.e., end further away from valve gate 1200) of piston component 1600, a circumferentially-extending (i.e., cylindrical) shield 1620 may be disposed, as shown in FIGS. 2, 3A, 3B, and 4B. Shield 1620 substantially prevents fluids, such as stimulation fluids (e.g., chemicals) and production fluids (e.g., oil and gas), particulates (e.g., proppant), and other matter in valve lumen 1116 from entering portions of bore 1132, such as those adjacent to seal 1636, when piston component 1600 is driven toward valve gate 1200. For example, without shield 1620, particulates such as proppant sand, may enter portion 1140 of bore 1132 between valve body 1100 and piston component 1600 when piston component 1600 is driven toward valve gate 1200 and away from the portion of valve body 1100 adjacent to portion 1140. Such particulates may become trapped in portion 1140 between valve body 1100 and piston component 1600 when the pressurized fluid in pocket 1604 is released (e.g., by return of the pressurized fluid through injection port 1414), and thereby cause damage to valve body and/or piston component 1600 (and/or seal 1636) because of, for example, the abrasive effect on such components by such particulates. Such materials may also otherwise enter recesses 1660 and interfere with operation of and/or erode biased springs 1664. Shield 1620 substantially prevents such issues by blocking passage of such materials from entering portion 1140 even while piston component 1600 is driven toward valve gate 1200. An additional angled cylindrical bore 1148 may be created (e.g., by machining) along, for example, the line 1124 (or along another acute angle) in valve body 1100 adjacent to the distal end of shield 1620. Angled bore 1148 can allow discharge of fluids, such as stimulation fluids (e.g., chemicals) and production fluids (e.g., oil and gas), particulates (e.g., proppant), and other matter, from the portion of bore 1132 that is opened to fluid communication with lumen 1116 when shield 1620 moves with the rest of piston component 1600 toward valve gate 1200. The small diameter of angled bore 1148 creates only a small amount of pipe loss in valve lumen 1116 when fluids are flowing therein (e.g., relative to an angled bore that extends to seal 1636).

As an additional means of sealing valve assembly 1300 against valve gate 1200 (e.g., in case the seal formed by pressuring seal assembly 1300 into contact with valve gate 1200 is insufficient), seal assembly 1300 may include a means for providing a sealant, such as a hydrocarbon-based sealant, to the face 1204 of valve gate 1200, which may coat such face with such sealant. To facilitate such additional sealing means, piston component 1600 may include a cylindrical piston lumen 1608 for facilitating transport of such sealant fluid to valve gate face 1204. Lumen 1608 may be a cylindrical opening within piston component 1600 with a cross-section as shown in FIG. 3A. Lumen 1608 may be positioned closer to valve gate 1200 than pocket 1604 and separated from pocket 1604 by seal 1628 such that lumen 1608 is substantially prevented from fluid communication with pocket 1604 by seal 1628. Another circumferential seal 1632 (e.g., O-rings or the like) may be positioned on the other side of lumen 1608 (i.e., closer to valve gate 1200) on an outer circumferential surface of piston component 1600, which may substantially prevent (together with seal 1628) any non-pressurized fluid from escaping piston lumen 1608. Piston lumen 1608 can extend at one end from and be in fluid communication with tube 1444 of non-pressurized injection port 1440. Such end of piston lumen 1608 may include a circumferential half-circle opening 1652 (shown more clearly in FIG. 3B) that may extend, if desired, close to the edges of cylindrical seals 1628, 1632, which may assist injection of non-pressurized fluid from injection port 1440 in piston lumen 1608 (for example, after piston component has been driven toward gate valve 1200). As shown more clearly in FIG. 3B, lumen 1608 includes a first section 1644 that is substantially orthogonal (but need not be) to the axis of valve assembly 1000 and terminates at one end (i.e., circumferential half-circle opening 1652) at the interior surface of valve body 1100 in bore 1132. Section 1644 of piston lumen 1608 terminates at its other end at intersecting section 1648 of valve lumen 1608. Section 1648 is substantially parallel (but need not be) to the axis of valve assembly 1000 and extends to and terminates at face 1612 of piston component 1600 (which is in contact with face 1512 of valve seat 15000), such that lumen 1608 is in fluid communication with a lumen 1508 positioned within valve seat 1500. Piston lumen 1608 and valve seat lumen 1508 may meet at a pocket formed by corresponding cylindrical half-circle openings 1616, 1516 formed (e.g., by machining) in faces 1612, 1512, respectively, of piston component 1600 and valve seat 1500, respectively.

Valve seat lumen 1508 may be a cylindrical opening within valve seat 1500 with a cross-section as shown in FIG. 3A and may extend to end 1520 and be in fluid communication at end 1520 (i.e., at cylindrical half-circle opening 1524 of valve seat face 1520) with valve gate face 1204. Valve seat 1500 may include a cylindrical seal 1528 (e.g., O-ring or the like) disposed on face 1512 (i.e., in a recess 1540—see FIGS. 3B and 4A) at a diameter greater than the diameter of lumen 1508 to substantially prevent any of the injected fluid from injection port 1440 from flowing in that direction (i.e., toward valve body 1100) out of pocket 1616, 1516. Alternatively, cylindrical seal 1528 may be positioned in a recess (substantially similar to recess 1540) on face 1612 of piston component 1600. Recess 1540 (or the corresponding recess on face 1612 in such an embodiment) may be positioned anywhere along face 1512 (or face 1612 in such embodiment) that does not extend to the outer circumferential surface of valve seat 1500. As shown more clearly in FIG. 3B, piston component 1600 includes one or more (e.g., five, as shown), circumferentially-extending fluid pockets 1656 disposed at a diameter less than the diameter of lumen 1508, which may receive fluid injected through lumen 1608 that does not enter lumen 1508 and that flows between faces 1512 and 1612. If such fluid is a sealant, such as a hydrocarbon-based sealant, then the sealant retained in such sealant pocket(s) 1656 will substantially seal any gap between faces 1512, 1612.

Additionally or alternatively, a second cylindrical seal (not shown), which may be substantially similar to seal 1528, may be disposed on face 1512 (or face 1612) at a diameter less than the diameter of lumen 1508 to substantially prevent any of the injected fluid from injection port 1440 from flowing in that direction (i.e., away from valve body 1100) out of pocket 1616, 1516. Additionally or alternatively, one or more circumferentially-extending fluid pockets, such as pockets 1656, may be disposed at a diameter greater than the diameter of lumen 1508, which may receive fluid injected through lumen 1608 that does not enter lumen 1508 and that flows between faces 1512 and 1612. If such fluid is a sealant, such as a hydrocarbon-based sealant, then the sealant retained in such sealant pocket(s) will substantially seal any gap between faces 1512, 1612 and substantially prevent any further fluid from entering such gap.

In operation, non-pressurized fluid injection port 1440 (which may be capable of injecting pressurized fluid) may inject fluid, including non-pressurized fluid (e.g., hydrocarbon-based sealant), through tube 1444 (or directly into a cavity 1136 as similarly described with reference to pressurized injection port 1410 above) into lumen 1608, through lumen 1608 into lumen 1508, and through lumen 1508 into sealing contact with valve gate face 1204 to thereby seal valve gate face 1204 against face 1520 of seal assembly 1300. Non-pressurized fluid injection port 1444 may be configured similarly to pressurized fluid injection port 1410 and may include a valve assembly 1448 that is biased to prevent fluid injection through tube 1444 (or directly into cavity 1136) by a spring 1452, and that allows injection of fluid, such as hydrocarbon-based sealant fluid, into tube 1444 (or directly into cavity 1136) when distal component 1456 is compressed toward flange 1460. Non-pressurized fluid injection port 1440 may be positioned at least partially in recess 1120 of valve body 1100.

Valve seat 1500 may also include a cylindrical valve seat recess 1536 on an outer circumferential surface 1532 of valve seat 1500 to facilitate discharge of any fluids or particulates that may otherwise be positioned between valve gate face 1204 and valve seat face 1520 (e.g., when the seal between seal assembly 1300 and valve gate 1200 is released so that valve gate 1200 may be opened). Outer circumferential surface 1532 may have a diameter that is less than the diameter of bore 1132 (e.g., by a relatively small amount that is still sufficient to permit passage of fluids, chemicals and other matter from valve lumen 1116) at the location where bore 1132 is adjacent to valve seat 1500. This difference in diameter between surface 1532 and the adjacent portion of bore 1132 may only extend to valve seat recess 1536, as shown in FIG. 3A. Fluids, particulates, or other materials that are positioned between valve gate face 1204 and valve seat face 1520 (e.g., when the seal between seal assembly 1300 and valve gate 1200 is released so that valve gate 1200 may be opened) may be discharged, at least in part, toward portion 1144 of bore 1132, through the gap between bore 1132 and surface 1532 of valve seat 1500, and into recess 1536. This feature prevents fluids, particulates, and other materials from becoming trapped between valve gate face 1204 and valve seat surface 1520 where they may otherwise interfere with the seal and/or cause damage to valve gate 1200 or seal assembly 1300. Even small particulates, such as proppant sand, are capable of causing substantial damage to such components due the high pressures exerted by the seal assemblies against the valve gate.

Figure 4B:
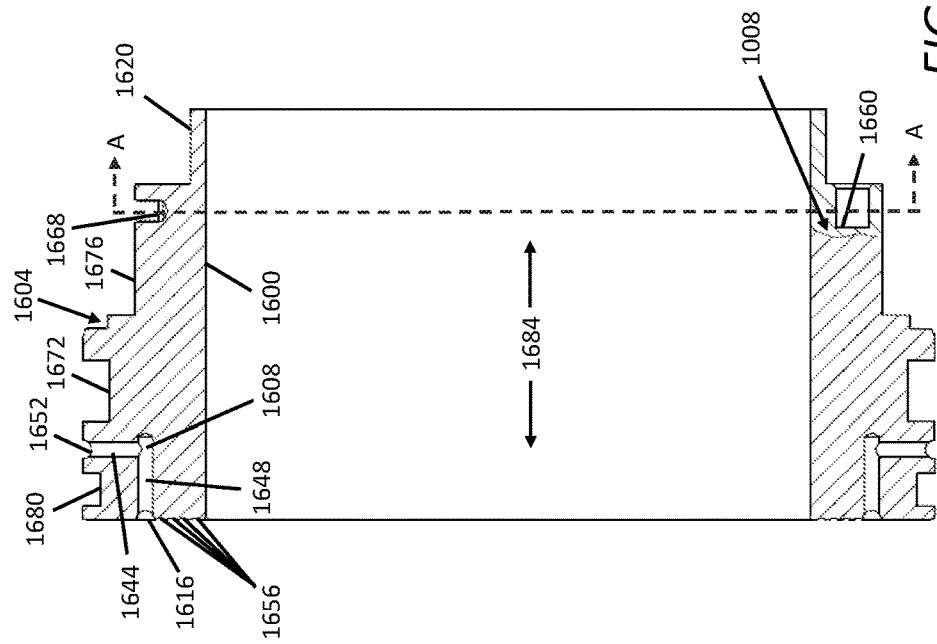
FIGS. 4A and 4B depict cross-sectional top views of a valve seat component and a piston component, respectively, of a valve seal assembly according to some embodiments of the present systems, apparatuses, and methods.
Figure 4A:
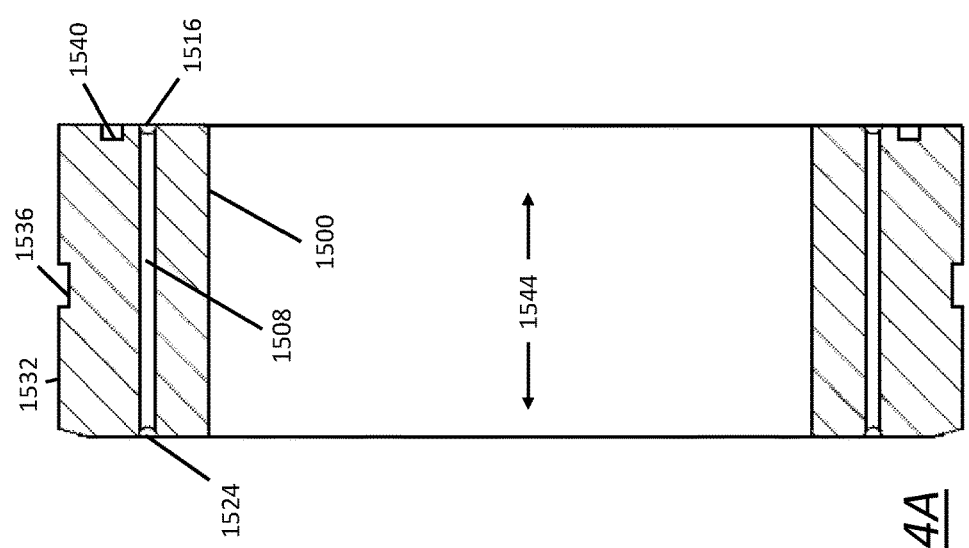
Figure 5:
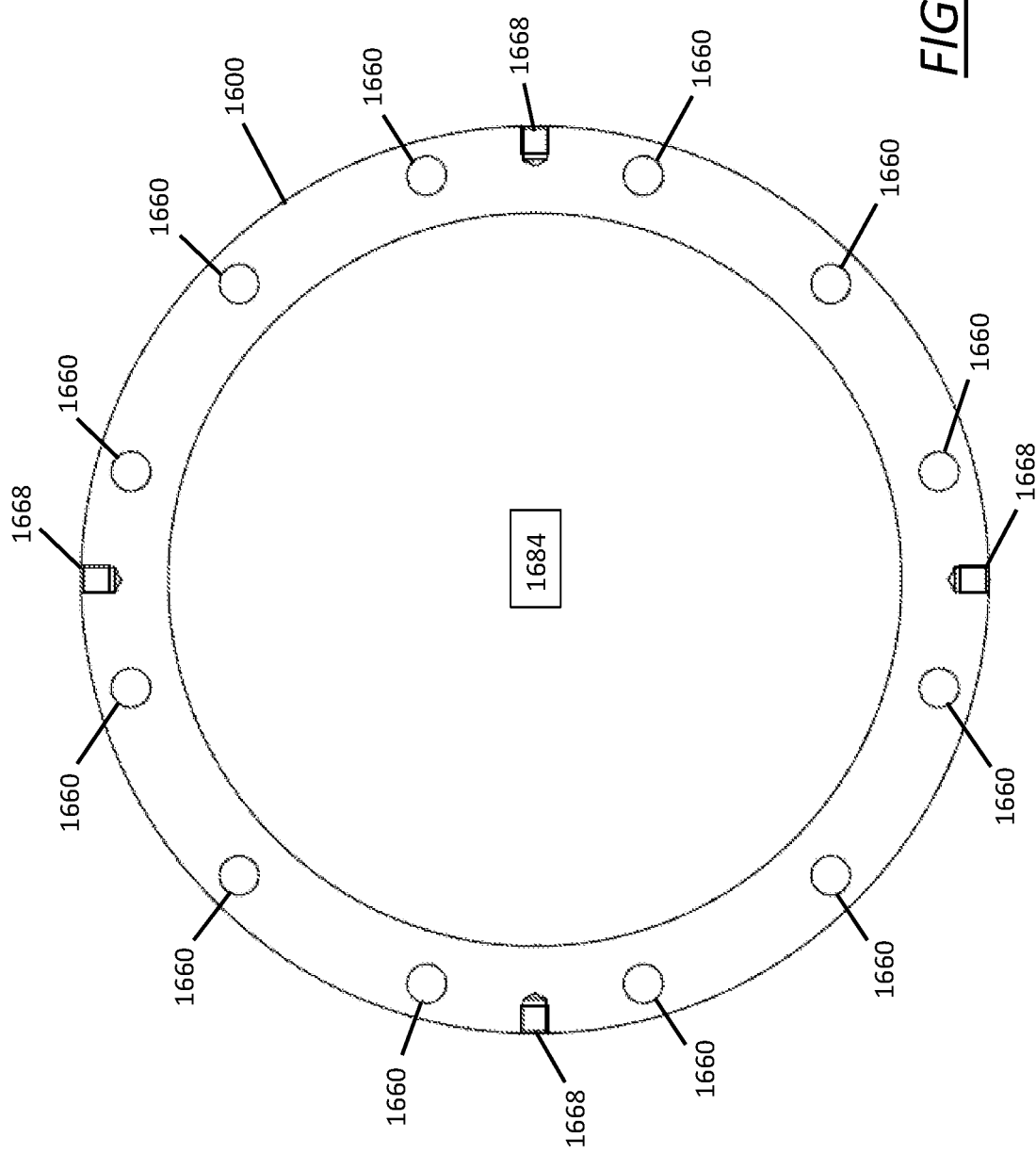
FIG. 5 depicts a cross-sectional view of the piston component of FIG. 4B along the line A-A indicated in FIG. 4B herein.

Referring now to FIGS. 4A and 4B, side cross-sectional views of a valve seat 1500 and a piston component 1600 before assembly into a frac valve apparatus, such as frac valve apparatus 1000, are shown, respectively. The components shown in FIGS. 4A and 4B do not include any seals, such as circumferential-extending seals 1528, 1632, 1628, 1624, and 1636 (which would be disposed in recesses 1540, 1680, 1672, and 1676 (for both seals 1604 and 1636), respectively, when assembled). Similarly, spring 1664 is not shown disposed in recess 1660 in FIG. 4B. Valve seat 1500 and piston component 1600 include lumens 1544, 1684 respectively, which have substantially the same diameter as one another and as the diameter of valve lumen 1116 when assembled in frac valve apparatus 1000.

Figure 6:
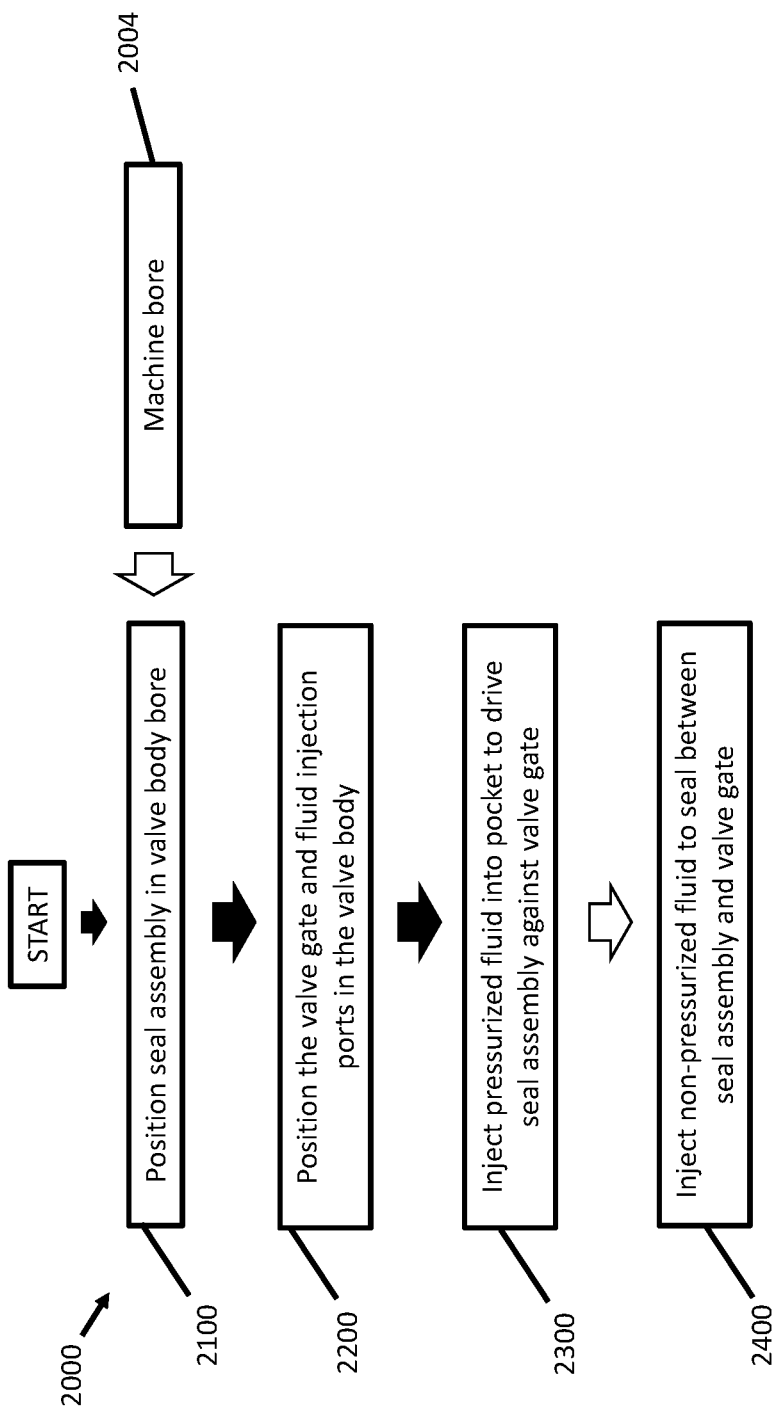
FIG. 6 depicts a flow chart of a method for sealing a frac valve according to some embodiments of the present systems, apparatuses, and methods.

A method 2000 of operating a frac valve apparatus, such as frac valve apparatus 1000, will now be discussed with reference to FIG. 6. To begin, at step 2100, a seal assembly, such as seal assembly 1300, is positioned in a valve body of the frac valve apparatus, such as valve body 1100. This may be performed by decoupling any other equipment, such as pipes or pumps from the valve body (e.g., at flange connections, such as flange connections 1112) and, if needed or desired, removing the valve gate and valve gate assembly, in order to access the interior bore of the valve body and allow placement of the seal assembly therein. If an existing valve body is being modified to be a frac valve apparatus such as that taught herein, then additional step 2004 may be need be performed. In step 2004, after removing the valve gate and related components, the bore is machined to accept one or more valve assemblies, such as valve assemblies 1300 by machining the bore to match accept the seal assemblies (i.e., like the same of bore 1132 provided herein).

In one embodiment, at step 2100, the valve gate (such as a valve gate 1200) may be removed and a piston component of a seal assembly (such as piston component 1600) having seals, springs, pins and other components needed or desired for operation is inserted where the valve gate was positioned and then moved into position along the valve lumen (such as valve lumen 1116) into its proper position in the valve bore (such as in bore 1132 in the manner shown in FIG. 2 herein). A valve seat of the seal assembly (such as valve seat 1500) having seals and other components needed or desired for operation may then be similarly inserted where the valve gate was positioned and then moved into position along the valve lumen into its proper position against the piston component in the valve bore (e.g., similar to how valve seat 1500 is positioned in FIG. 2 herein). A similar process may be performed to position a second seal assembly into the bore on the other side of the valve gate in the valve body. As will be understood, the use of a multiple (e.g., two) component seal assembly, such as seal assembly 1300 having a piston component 1600 and valve seat 1500, has the advantage of allowing assembly of the seal assembly into an already manufactured valve body, so long as the components each have a maximum axial length (in the valve lumen axial direction) that is less than or equal to the maximum axial length of the valve gate, so that such components may fit into the space where the valve gate was positioned before being moved through the valve lumen.

After positioning the seal assembly in the valve body, step 2200 may be performed, whereby the valve gate and other frac valve components that were removed are reassembled and fluid injection valves, such as fluid injection valves 1400 (if not already present in valve body 1100), may be inserted and affixed, if desired, to the valve body.

Next, at step 2300, after assembly (and testing, if desired) of the frac valve apparatus, the valve gate may be closed and sealed by injecting pressurized fluid into a pocket of the seal assembly(ies), such as pocket 1604 of piston component 1600, to drive the seal assembly(ies) into sealing contact against the valve gate, as described herein. Additionally or alternatively, at step 2400, the valve gate may be sealed by injecting non-pressurized fluid, such as a hydrocarbon-based sealant, through a fluid injection port to the face(s) of the valve gate to seal them against the seal assembly. While step 2400 is shown in FIG. 6 as occurring after step 2300, that is not required and step 2400 may be performed independently, including before step 2300 or without step 2300 occurring at all. Similarly, step 2300 may be performed as indicated independently of step 2400, including before step 2400 as shown, or without step 2400 occurring at all. In some applications, step 2300 will provide a primary means of sealing the valve gate and step 2400 will provide an additional, e.g., precautionary/redundant, means of sealing the valve gate.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A valve seal apparatus comprising:
   a seal assembly configured to be positioned (A) in contact with a valve body, (B) in a seal assembly bore formed in the valve body, (C) at least partially within a fluid flow path of the valve body, and (D) substantially adjacent to a face of a valve gate;
   a first fluid injection port configured to (A) be in fluid communication with the seal assembly and (B) facilitate injection of a first fluid into a pocket of the seal assembly bore under pressure against the seal assembly and not to the face of the valve gate to drive the seal assembly into contact with the face of the valve gate without substantial relative movement between components of the seal assembly;
   a seal positioned in contact with the seal assembly and valve body; and
   an energizer ring positioned in contact with the seal assembly, valve body, and seal, wherein:
   the pocket is positioned entirely between the valve gate and each of the seal and energizer ring; and
   the energizer ring is positioned at an end surface of the seal assembly.

2. The apparatus of claim 1, further comprising a second fluid injection port configured to (A) be in fluid communication with a lumen of the seal assembly and (B) facilitate injection of a second fluid into the lumen of the seal assembly and to the face of the valve gate.

3. The apparatus of claim 1, where the seal assembly comprises a recess positioned in an outer circumferential surface of the seal assembly and configured to receive particulates or fluids that enter a gap between the seal assembly and the face of the valve gate.

4. The apparatus of claim 1, wherein the seal assembly comprises:
 a valve seat configured to be positioned substantially adjacent to the face of the valve gate and not in fluid communication with the first fluid;
 a piston configured to be in fluid communication with the first fluid and positioned within the fluid flow path of the valve body; and
 the valve seat and the piston are each disposed within the seal assembly bore and at least partially in contact with the valve body.

5. The apparatus of claim 4, further comprising a spring configured to (A) be positioned between the valve body and the piston and (B) bias the seal assembly toward the face of the valve gate and wherein the piston defines a recess configured to accommodate the piston.

6. The apparatus of claim 1, wherein the seal assembly comprises a shield configured to prevent particulates or fluids from the fluid flow path entering the pocket, and wherein each of the seal and the energizer ring are positioned between the shield and the valve gate.

7. The apparatus of claim 6, where the valve body includes an angled bore adjacent to the shield to allow discharge of particulates or fluids from the seal assembly bore and where the angled bore is in fluid communication with a valve lumen defined by the valve body.

8. The valve seal apparatus of claim 1, wherein the energizer ring has a first surface in contact with the valve body and a second surface different than the first surface in contact with the valve body, the second surface being coplanar with the end surface of the seal assembly.

9. The valve seal apparatus of claim 8, wherein the first surface and the second surface of the energizer ring are configured to be in contact with the valve body when the seal assembly is in contact with the face of the valve gate.

10. A method for sealing a valve comprising:
 positioning a seal assembly (A) in contact with a valve body, (B) in a seal assembly bore formed in the valve body, (C) at least partially within a fluid flow path of the valve body, and (D) substantially adjacent to a face of a valve gate;
 positioning a seal in contact with the seal assembly and valve body such that a pocket of the seal assembly bore is positioned entirely between the valve gate and the seal;
 positioning an energizer ring at an end surface of the seal assembly and in contact with the seal assembly, valve body, and seal such that the pocket is positioned entirely between the valve gate and the energizer ring; and
 injecting a first fluid into the pocket under pressure against the seal assembly and not to the face of the valve gate to drive the seal assembly into contact with the face of the valve gate without substantial relative movement between components of the seal assembly.

11. The method of claim 10, further comprising the step of driving with the first fluid a piston component of the seal assembly so that the piston component drives a valve seat component of the seal assembly into contact with the face of the valve gate, where the first fluid does not contact the valve seat and where the piston component is positioned within the fluid flow path of the valve body.

12. The method of claim 10, further comprising the step of biasing the seal assembly toward the face of the valve gate with a spring positioned between the valve body and the seal assembly.

13. The method of claim 10, further comprising the step of injecting a second fluid into a lumen of the seal assembly and to the face of the valve gate.

14. The method of claim 10, further comprising the step of receiving within a recess on an outer circumferential surface of the seal assembly particulates or fluids that had entered a gap between the seal assembly and the face of the valve gate.

15. The method of claim 10, further comprising the step of preventing particulates or fluids from the fluid flow path entering the pocket with a shield component of the seal assembly.

16. The method of claim 15, further comprising the step of discharging particulates or fluids that have entered a portion of the seal assembly bore into an angled bore of the valve body positioned adjacent to the shield by permitting the shield to move into the portion of the seal assembly bore where the particulates or fluids have entered.

17. A system for sealing a valve comprising:
 a valve body having a first end, a second end, a seal assembly bore, and a valve lumen, the valve lumen configured to facilitate fluid flow between the first end and the second end;
 a valve gate configured to enter into the valve lumen to prevent fluid flow between the first end and second end of the valve body along the valve lumen;
 a seal assembly configured to be positioned (A) in contact with the valve body, (B) in the seal assembly bore, (C) in fluid communication with the valve lumen, and (D) substantially adjacent to a face of the valve gate;
 a first fluid injection port configured to (A) be in fluid communication with the seal assembly and (B) facilitate injection of a first fluid into a pocket of the seal assembly bore under pressure against the seal assembly and not to the face of the valve gate to drive the seal assembly into contact with the face of the valve gate without substantial relative movement between components of the seal assembly;
 a seal positioned in contact with the seal assembly and valve body; and
 an energizer ring positioned in contact with the seal assembly, valve body, and seal, the energizer ring defining at least one opening configured to receive a pin to couple the energizer ring to the seal assembly;
 wherein the pocket is positioned entirely between the valve gate and each of the seal and energizer ring.

18. The system of claim 17, wherein the seal assembly further comprises:
 a valve seat configured to be positioned substantially adjacent to the face of the valve gate and not in fluid communication with the first fluid; and
 a piston configured to be in fluid communication with the first fluid and positioned within a fluid flow path of the valve body.

19. The system of claim 17, where the seal assembly further comprises a spring configured to be positioned between the valve body and the seal assembly, and further configured to bias the seal assembly toward the face of the valve gate.

20. The system of claim 17, wherein
the at least one opening of the energizer ring includes multiple openings circumferentially spaced along the energizer ring;
the seal assembly comprises a shield extending along a portion of the valve body and configured to prevent particulates or fluids from the fluid flow path entering the pocket, and
the valve body includes an angled bore adjacent to the shield to allow discharge of particulates or fluids from the seal assembly bore, the angled bore defining a portion of the valve lumen.

21. The system of claim 17, further comprising a second fluid injection port configured to (A) be in fluid communication with a seal assembly lumen and (B) facilitate injection of a second fluid into the seal assembly lumen and to the face of the valve gate.

22. The system of claim 17, where the seal assembly comprises: a recess positioned in an outer circumferential surface of the seal assembly and configured to receive particulates or fluids that have entered a gap between the seal assembly and the face of the valve gate.

* * * * *